(12) United States Patent
Bayer et al.

(10) Patent No.: US 11,473,660 B2
(45) Date of Patent: Oct. 18, 2022

(54) HYDRODYNAMIC TORQUE CONVERTER

(71) Applicant: ZF Friedrichshafen AG, Friedrichshafen (DE)

(72) Inventors: Ewgeni Bayer, Sipplingen (DE); Ralf Beck, Oberteuringen (DE); Peter Brielmaier, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/366,802

(22) Filed: Jul. 2, 2021

(65) Prior Publication Data

US 2022/0003301 A1  Jan. 6, 2022

(30) Foreign Application Priority Data

Jul. 3, 2020 (DE) ............... 10 2020 208 351.7

(51) Int. Cl.
 *F16H 45/02* (2006.01)
 *F16H 57/04* (2010.01)
 *F16H 45/00* (2006.01)

(52) U.S. Cl.
 CPC ......... *F16H 45/02* (2013.01); *F16H 57/0423* (2013.01); *F16H 57/0473* (2013.01); *F16H 2045/002* (2013.01); *F16H 2045/0215* (2013.01); *F16H 2045/0221* (2013.01)

(58) Field of Classification Search
 CPC .. F16H 45/02; F16H 57/0423; F16H 57/0473; F16H 2045/002; F16H 2045/0215; F16H 2045/0221
 See application file for complete search history.

(56) References Cited

U.S. PATENT DOCUMENTS

| 8,919,509 | B2* | 12/2014 | Maienschein | ........... F16H 45/02 |
| | | | | 192/55.61 |
| 10,634,227 | B2* | 4/2020 | Suzuki | ..................... F16H 45/02 |
| 2019/0072165 | A1* | 3/2019 | Yin | ......................... F16H 45/02 |

* cited by examiner

*Primary Examiner* — Tinh Dang
(74) *Attorney, Agent, or Firm* — Finch & Maloney PLLC; Jay S. Franklin; Michael J. Bujold

(57) ABSTRACT

A hydrodynamic torque converter (1) with a pump wheel (3) and with a turbine wheel (4), and with a torsion damper (8) and with an intermediate space (12) located between the turbine wheel (4) and the torsion damper (8), and with a torus formed by the pump wheel (3) and the turbine wheel (4) for hydraulic fluid. A flow-guiding wall (14) is provided, which deflects a radially outward flow of hydraulic fluid coming from the torus, back radially inward to the intermediate space (12).

11 Claims, 2 Drawing Sheets

HYDRODYNAMIC TORQUE CONVERTER

This application claims priority from German patent application serial no. 10 2020 208 351.7 filed Jul. 3, 2020.

FIELD OF THE INVENTION

The invention relates to a hydrodynamic torque converter with a torsion damper.

BACKGROUND OF THE INVENTION

Hydrodynamic torque converters are clutches that work in accordance with the Föttinger principle. Owing to their virtually wear-free operating mode they are used in many technical fields for the transmission of rotation movements. These torque converters often have a converter bridging clutch, also known just as a "bridging clutch" for short. This serves to make it possible to bridge the otherwise hydrodynamic clutch of the converter, where necessary, by means of a mechanical clutch. In that way flow losses in the converter can be minimized.

In automotive technology hydrodynamic torque converters are often used as a starting clutch and/or as an integral transmission shifting element. The torque converter is in this case provided as an input-side or a central shifting element of a multi-stage motor vehicle transmission. Thus, the torque converter is connected to the transmission by the action of torque. In the hydrodynamic operation of the torque converter a drive input power is transmitted by means of hydraulic fluid. This takes place virtually without wear, so that it is the hydraulic fluid which predominantly absorbs the heat losses generated thereby. For that reason the torque converter is often connected to a cooling system of the transmission and/or the motor vehicle. Heat energy is produced in particular in the hydrodynamic torus of the converter and by friction work in the bridging clutch.

Hydrodynamic torque converters normally have a low-pressure side (suction side) and a high-pressure side (pressure side). In many transmission arrangements, for design reasons the feed line for hydraulic fluid to the converter cannot be arranged on the suction side of the latter and the return line for the hydraulic fluid from the converter cannot be arranged on its pressure side. The lines are then arranged elsewhere on the converter. Consequently heat can accumulate inside the converter and this can result in damage to temperature-sensitive converter components. Exceeding acceptable temperatures in the converter can also result in increased wear of the bridging clutch and heating of the hydraulic fluid.

From DE 10 2005 051 739 A1 a hydrodynamic torque converter with a bridging clutch and a torsion damper is known. The bridging clutch is intended to show constant behavior over a very long lifetime. For this, direct cooling of the clutch disks of the bridging clutch through an axial piston of the converter and the torsion damper is proposed.

DE 10 2007 005 999 A1 also discloses a hydrodynamic torque converter. In this case leakage flows that affect the cooling adversely and undesired friction effects are to be avoided. For that purpose a pressure chamber on the drive output side is delimited by the drive output side of the clutch piston and by a partition wall associated with the clutch piston. For its part, the partition wall acts between the pressure chamber on the drive output side and a cooling chamber.

From DE 20 2006 020 596 U1 a hydrodynamic torque converter with a bridging clutch and a damper is known. In this case the intention is to improve an oil flow over friction surface of the disks of the bridging clutch in order to improve the cooling of the disks. For this, the circulation oil flow in the area of the hydrodynamic structural elements of the converter (pump, turbine, guide wheel) should still flow to and from the disks. For that purpose an additional wall is fitted on the side of the clutch piston that faces away from the piston pressure space.

When the oil flow in a hydrodynamic torque converter takes place from the torus to the bridging clutch, for example as indicated by arrows in the figures of DE 20 2006 020 596 U1, the bridging clutch, besides the friction heat generated there, takes up additional heat from the oil flow. Thus, most of all during slipping operation of the bridging clutch there can be unacceptably high heat intake by the bridging clutch. This can result in damage to the bridging clutch. Such damage can mainly affect friction linings of the bridging clutch, since these often consist of friction-lining paper.

SUMMARY OF THE INVENTION

The purpose of the present invention is to improve upon the prior art. In particular, good cooling of the bridging clutch of the torque converter should be enabled while keeping the production costs of the torque converter low.

This objective is achieved by the measures specified in the principal claim. Preferred embodiments thereof emerge from the subordinate claims.

According to these a hydrodynamic torque converter is proposed, which comprises a pump wheel, a turbine wheel and a torsion damper. The pump wheel, turbine wheel and torsion damper are in particular accommodated inside a housing of the converter. In particular, the pump wheel is positionally fixed in the housing. The pump wheel and the turbine wheel form a torus for hydraulic fluid. The turbine wheel can rotate relative to the pump wheel. There is an intermediate space between the turbine wheel and the torsion damper.

The torque converter can transmit a torque hydrodynamically by way of the hydraulic fluid from its input to its output. Depending on the design and operating point of the converter, it is also possible for the converter to increase the torque delivered from its output side compared with the torque applied at its input side.

The torsion damper serves to damp torsion fluctuations between the input and output sides of the torsion damper, in particular due to non-uniform rotation behavior of an internal combustion engine on the input side. In that way torsion fluctuations applied on the input side are not passed on to the output side, or only so after being damped.

In the torque converter proposed, it is now provided that a flow-guiding wall is arranged in the housing. This wall is specially designed to deflect a flow of the hydraulic fluid emerging radially outward from the torus during the operation of the torque converter, radially inward toward the intermediate space. The result is that at least most of the hydraulic fluid flow emerging radially outward from the torus passes into the intermediate space.

The hydraulic fluid previously heated in the torus can now be simply removed from the intermediate space. In particular, for this an outlet opening for the hydraulic fluid is provided in the area of the intermediate space. Thus, the hydraulic fluid of the torus no longer reaches particularly temperature-sensitive structural elements of the torque converter, or only so to a slight extent, such elements including in particular the converter bridging clutch. The bridging clutch is usually located on the side of the torsion damper facing away from the turbine wheel, i.e. on the other side of the intermediate space.

In particular, the torque converter thus also comprises the bridging clutch. To actuate the bridging clutch a hydraulic piston is preferably provided. For that, the piston has in particular a pressure side which can be acted upon by a hydraulic pressure. In that way an actuating force is exerted on the bridging clutch. The actuating force is reduced by decreasing the hydraulic pressure. In this way the clutch can be optionally closed and opened. When the bridging clutch is fully closed, the hydrodynamic power branch of the torque converter is bypassed (deactivated) in drive-technological terms, so that the torque on the input side is transmitted via the bridging clutch to the output of the converter. When the bridging clutch is fully open only the hydrodynamic power branch of the converter is activated, whereby a torque on the input side is transmitted to the output purely hydrodynamically. When a frictional bridging clutch is used, especially such as a disk clutch, intermediate settings between the fully open and fully closed positions can also be produced, whereby the torque on the input side is transmitted to the output partially by the bridging clutch and partially hydrodynamically.

The torsion damper of the converter is in particular arranged in the power branch of the bridging clutch, so that the torsion fluctuations introduced by the bridging clutch are damped. It can be provided that the torsion damper does not act in the hydrodynamic power branch.

Preferably, the flow-guiding wall is annular or bowl-shaped. It has a central opening positioned in the intermediate space. Thus, the flow-guiding wall can be made inexpensively.

In particular, the flow-guiding wall is made by deformation technology, in particular by pressing. Thus, the wall can be a cheap sheet component.

Preferably, the flow-guiding wall is a separate structural element for deflecting the flow of hydraulic fluid radially inward into the intermediate space. In particular, that is the only purpose of the separate structural element. Consequently, the flow-guiding wall can be made simply. It can be attached to other structural elements of the torque converter. In particular, the flow-guiding wall is welded or riveted or adhesively bonded to these other structural elements.

Alternatively, it is possible for the flow-guiding wall to be an integral part of some other, in any case necessary structural element of the torque converter. For example, the flow-guiding wall can be an integral part of the torsion damper or of the housing. The flow-guiding wall can then be in the form of a special rib or shoulder on the in any case necessary structural element of the torque converter.

Particularly preferably, the flow-guiding wall is suspended on the housing of the torque converter. Thus, the flow-guiding wall is supported by the housing. In that case the flow-guiding wall can be the separate structural element, which can then be fixed directly onto the housing.

The housing of the converter comprises in particular a (first) housing component, which accommodates the blades of the pump wheel. This housing component is in particular a rear half of the housing. The housing of the converter comprises in particular a (second) housing component which accommodates the torsion damper and/or the bridging clutch. This housing component is in particular a front half of the housing. Thus, the housing is essentially made in two parts.

The blades that form the pump wheel are preferably attached directly to the (first) housing component. Thus, this housing component at the same time forms the pump wheel. It can now be provided that the flow-guiding wall is suspended on the pump component. Alternatively, it can be provided that the flow-guiding wall is suspended on the (second) housing component, the one which accommodates the torsion damper and/or the bridging clutch. In that case the flow-guiding wall is preferably attached to the respective housing component. In that way the converter can be made inexpensively.

In particular, the two housing components are solidly connected to one another in a connection area, for example welded together. The flow-guiding wall can be suspended on this connection area. In particular the flow-guiding wall can be made as a separate structural element and be clamped between the two housing components in the connection area. In that way, when the housing components are joined together, the flow-guiding wall can be fixed to the housing at the same time.

Preferably, the outlet opening for the hydraulic fluid is arranged radially inside the intermediate space and between the torsion damper and the pump wheel. This allows hydraulic fluid to be discharged from the torque converter. An inlet opening for the hydraulic fluid can be arranged radially inside, on the other side of the torsion damper. In that way relatively cool hydraulic fluid is guided from the inlet opening, along one side of the torsion damper, to the bridging clutch, while the relatively hot hydraulic fluid from the torus is guided along the other side of the torsion damper to the outlet opening. Thus, a confluence of these flows is prevented as much as possible. The cooling of the bridging clutch is ensured. Here, the turbine wheel also located between the torsion damper and the pump wheel has in particular at least one opening, through which there is a connection for the hydraulic fluid from the intermediate space to the outlet opening. This enables the flow of the relatively hot hydraulic fluid out of the intermediate space to the outlet opening.

The inlet opening is in particular arranged in the radially inner area between the piston for actuating the bridging clutch and the torsion damper. Thus, during the operation of the torque converter hydraulic fluid passes into the converter in order to cool and lubricate the bridging clutch. The hydraulic fluid flows from the inlet opening radially outward to the bridging clutch. In particular, the inlet opening is designed to guide hydraulic fluid coming from a radially internal driveshaft into the intermediate space. The driveshaft is in particular a transmission input shaft.

Preferably, the bridging clutch is arranged on one side of the torsion damper between the housing on one side and the torsion damper on the other side. In this case the intermediate space is arranged on the other side of the torsion damper between the turbine wheel on one side and the torsion damper on the other side. The torsion damper has a torsion damper wall which guides the hydraulic fluid radially inward into the intermediate space. Thus, the torsion damper wall directs the flow of hydraulic fluid along the intermediate space in the direction toward the outlet opening. The torsion damper wall precludes an unacceptably large quantity of the relatively hot hydraulic fluid from flowing out of the intermediate space through the torsion damper to the bridging clutch. In this case the torsion damper wall is in particular positioned on the side of the torsion damper facing the intermediate space.

Preferably, this torsion damper wall screens the bridging clutch, at least or only in a radially outer area of the torsion damper, from the radially outward flow of hydraulic fluid coming from the torus. For example, in this radially outer area of the torsion damper a damper plate can be provided, which in that position prevents the passage of hydraulic fluid from the intermediate space through the torsion damper. It can be provided that in this radially outer area of the torsion damper, first curved springs are arranged on a common circumference or circumferential area. In the area of the curved springs conventional torsion dampers for hydrodynamic torque converters have window-like openings for the curved springs. By the torsion damper wall these openings are now closed for the hydraulic fluid, for example in that the openings are covered by the torsion damper wall.

In particular, the housing of the torque converter serves as the inlet of the torque converter. In this case the turbine wheel is arranged rotatably inside the housing and is connected rotationally fixed to the output side of the torsion damper. Here, the output side of the torsion damper serves as the drive output of the torque converter and is designed to be connected in a rotationally fixed manner to a radially inner driveshaft, in particular such as a transmission input shaft. The bridging clutch of the converter has an inlet connected rotationally fixed to the housing and an outlet connected rotationally fixed to the input side of the torsional damper. The input and output sides of the bridging clutch can optionally be connected rotationally fixed to one another and rotatably released from one another by moving the piston. The torsion damper, the bridging clutch and the piston are in particular also accommodated in the housing, in particular in the second housing component. The pump wheel is then in particular accommodated in the first housing component.

Optionally, a vehicle transmission is also proposed which comprises the proposed hydrodynamic torque converter. The transmission has a transmission input shaft by means of which a drive input torque can therefore be delivered to the transmission. The output of the torque converter is connected rotationally fixed to the transmission input shaft, and in particular the converter is arranged on the transmission input shaft. The motor vehicle transmission can be a multi-stage transmission. The transmission then has a plurality of selectable gear ratios by means of which, in each case, a torque applied on the input side can be transmitted, geared up or down, to the transmission output. In other words, the proposed hydrodynamic torque converter is specially designed to be installed in a motor vehicle transmission.

Preferred properties and advantages of the proposed hydrodynamic torque converter can be:
- defined, targeted guiding of the hydraulic fluid in the torque converter;
- prevention of flooding of the bridging clutch with hot hydraulic fluid directly from the torus gap, and thus prevention of thermal overheating of the bridging clutch;
- reduction of the wear of friction linings of the bridging clutch;
- simple design implementation, for example as a sheet-metal design and/or as a welded structure and/or as a component produced by deformation;
- less additional fitting space required and lower weight;
- low costs.

BRIEF DESCRIPTION OF THE DRAWINGS

Below, the invention is described in greater detail with reference to figures, from which further preferred embodiments of the invention emerge. The figures show, in each case represented schematically.

DETAILED DESCRIPTION OF THE PREFERRED EMBODIMENTS

In the figures, the same or at least functionally equivalent components are denoted by the same indexes. For the sake of simplicity, in each case only the upper half of the torque converter 1 is shown, The lower half can be made mirror-symmetrically thereto.

Figure 1:
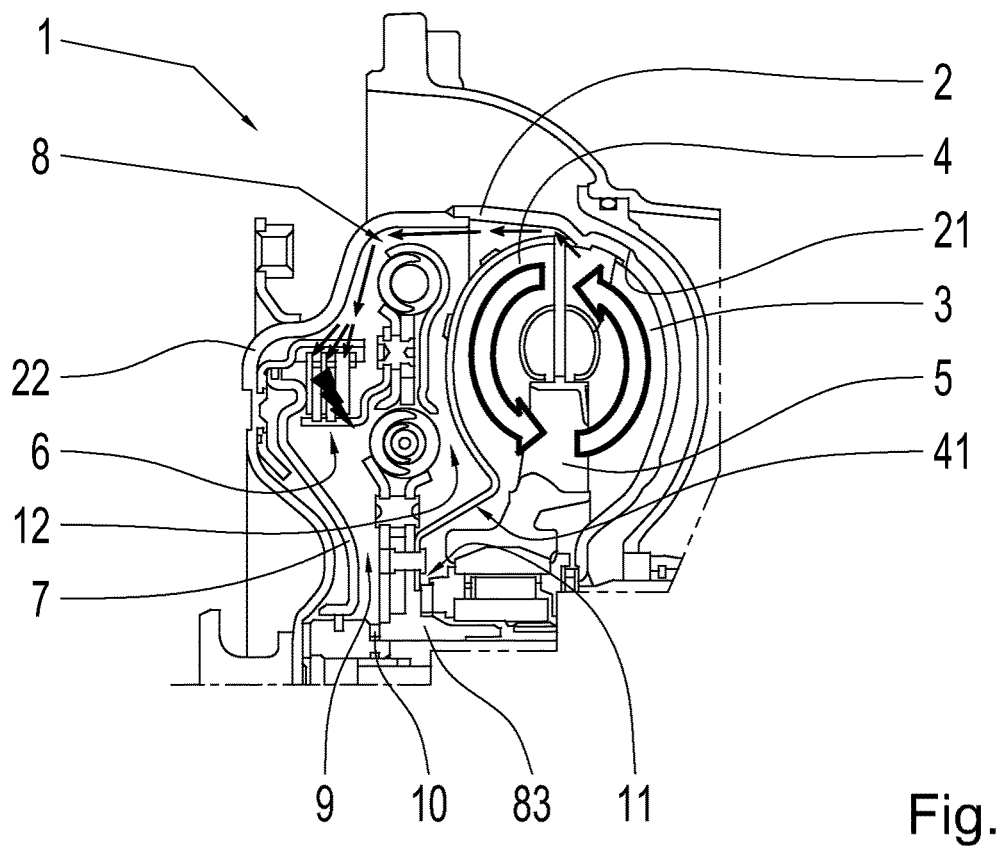
FIG. 1: A hydrodynamic torque converter.

FIG. 1 shows the upper half of a longitudinal section through a hydrodynamic torque converter 1. In this example the converter 1 is arranged on the input side of a vehicle transmission (not shown). In a manner known as such the converter 1 has a multi-component housing 2, a pump wheel 3 and a turbine wheel 4, as well as an optional guide wheel 5. The pump wheel 3 is an integral part of the housing component 21 (first/rear component) shown on the right in FIG. 1. For this, blades are attached to the housing component 21. Thus, the housing component 21 can also be thought of as the pump part of the housing 2.

The pump wheel 3 and the turbine wheel 4 together form a torus, inside which, during the operation of the converter 1, hydraulic fluid circulates, so that a drive input torque applied to the housing 2 is transmitted hydrodynamically via the pump wheel 3 to the turbine wheel 4. In FIG. 1 the flow of the hydraulic fluid inside the torus is represented for example by arrows. That principle is known by the name of the Fottinger principle, and therefore needs no further explanation.

The torus is not hermetically sealed. In particular, in the radially outer area of the pump wheel 3 and the turbine wheel 4 there is a gap between those structural elements 3, 4. During the operation of the converter 1 hydraulic fluid passes via this gap out of the torus into the rest of the housing 2. In unfavorable operating conditions of the converter 1, starting from the gap a fluid flow can take place that extends into the front area of the housing 2 (on the left in FIG. 1). In FIG. 1 this fluid flow is indicated by thin arrows. Since the hydraulic fluid in the torus is hot, the flow can also carry a lot of heat into the front area of the housing 2 and this can correspondingly result in heating of the structural elements 6, 8 of the converter 1 therein.

Inside the (second/front) housing component 22 shown on the right in FIG. 1, a bridging clutch 6 is provided. This is in the form of a frictional disk clutch. The bridging clutch 6 can be actuated by a hydraulic piston 7 that can be moved in the axial direction. The piston 7 is also arranged in the housing 2. By way of the piston 7, a drive input torque applied on the input side can be transmitted to the output side of the converter 1, bypassing the hydrodynamic power branch of the converter 1. Depending on the contact pressure applied to the disks of the clutch 6, a smaller or greater proportion of the drive input torque transmitted will be transmitted by the clutch 6 to the output side of the converter 1.

Furthermore, inside the housing component 22 a torsion damper 8 is arranged. The purpose of this damper 8 is to damp or eliminate rotational non-uniformities of the drive input torque applied at the input side, in particular when the clutch 6 is in use. A hub 83 serves as the output side of the damper 8 and the converter 1. The hub 83 is arranged rotationally fixed on a transmission input shaft. The essential structure of such a damper 9 is also already known as such, and so needs no further explanation.

The clutch 6 is connected to the input side of the damper 8, so that drive input torque passing in via the clutch is transferred to the damper 8. For this, inner disks of the clutch 6 are arranged rotationally fixed on an inner disk carrier which is part of the input side of the damper 8. In contrast, the turbine wheel 4 is fixed directly to the output side of the damper 8, in particular with the hub 83. Thus, the drive input torque passed in via the hydrodynamic power branch of the converter 1 is not damped by the damper 8.

Between the piston 7 and the damper 8 there is formed a (first/front) intermediate space 9. Radially on the outside the intermediate space 9 is delimited by the clutch 6. Radially on the inside of the intermediate space 9 there is an inlet opening 10 for hydraulic fluid, which is passed to the converter 1 via the transmission input shaft in a targeted manner. This serves both to transmit torque in the hydrodynamic part of the converter 1 and also to cool and lubricate the components of the converter 1. Heat, which is generated during slipping operation of the clutch 6, is dissipated by the hydraulic fluid entering the first intermediate space 9. For this it is necessary that the hydraulic fluid coming in flows around and through the clutch 6. The hydraulic fluid coming in is usually cooler than the hydraulic fluid in the torus, since it has been passed beforehand through a heat exchanger outside the converter 1.

Between the damper 8 and the turbine wheel 4, a further (second/rear) intermediate space 12 is formed.

The converter 1 also has at least one outlet opening 11 for the hydraulic fluid present in the converter 1. This at least one outlet opening 11 is in particular radially inside the pump wheel 3 and/or the turbine wheel 4. The outlet opening 11 is arranged axially between the damper 8 and the pump wheel 3. The outlet opening 11 can be provided in the area of bearing points of the guide wheel 5. A roller bearing for supporting the guide wheel 5 can be located inside the outlet opening 11 so that hydraulic fluid flowing out flows through the roller bearing. The hydraulic fluid emerging from the converter 1 is preferably passed into the heat exchanger outside the converter 1, in order to cool the fluid. The hydraulic fluid cooled in that way can then be fed back into the converter 1 again, through the inlet opening 10. In that way the converter 1 is connected into a cooling and lubrication circuit.

So that the hydraulic fluid can easily flow out of the outlet opening 11, which is outside the torus in the converter 1, in the radially inner area of the turbine wheel 4 one or more opening(s) 41 is/are provided. Through this at least one opening 8A the hydraulic fluid that has passed into the intermediate space 12 flows out again.

As already explained earlier, the flow of hot hydraulic fluid coming from the torus can pass into the housing component 22 and make its way to the clutch 6. In the area of the clutch 6 this relatively hot flow can totally or partially deflect the relatively cooler hydraulic fluid flowing in from the inlet opening 10, or it can result in a build-up of fluid in the area of the clutch 6. As a result, additional heating can take place in the clutch 6 due to the relatively hot hydraulic fluid. It may also be more difficult to dissipate heat from the clutch 6. This can lead to damage of the components and/or to increased wear, both of the clutch 6 and of the hydraulic fluid. In particular, the friction linings of the clutch 6 can be affected thereby.

To achieve an improvement in that respect, a flow-guiding wall in the housing 2 is now proposed. In a targeted manner this guides the relatively hot radially outward flow of hydraulic fluid coming from the torus, radially inward toward the inside, before the flow reaches the clutch 6. In that way the relatively hot flow passes into the intermediate space 12. From there, the hydraulic fluid passes on via the opening 41 in the turbine wheel 4 to the outlet opening 11 and hence out of the converter 1. At the same time the relatively cool hydraulic fluid entering the converter 1 from the inlet opening 10 is not, or only slightly disturbed or deflected in the area of the clutch 6. Thereby, the cooling of the clutch 6 is substantially improved and the amount of heat passing into the clutch 6 from the relatively hot hydraulic fluid is minimized.

Figure 2:
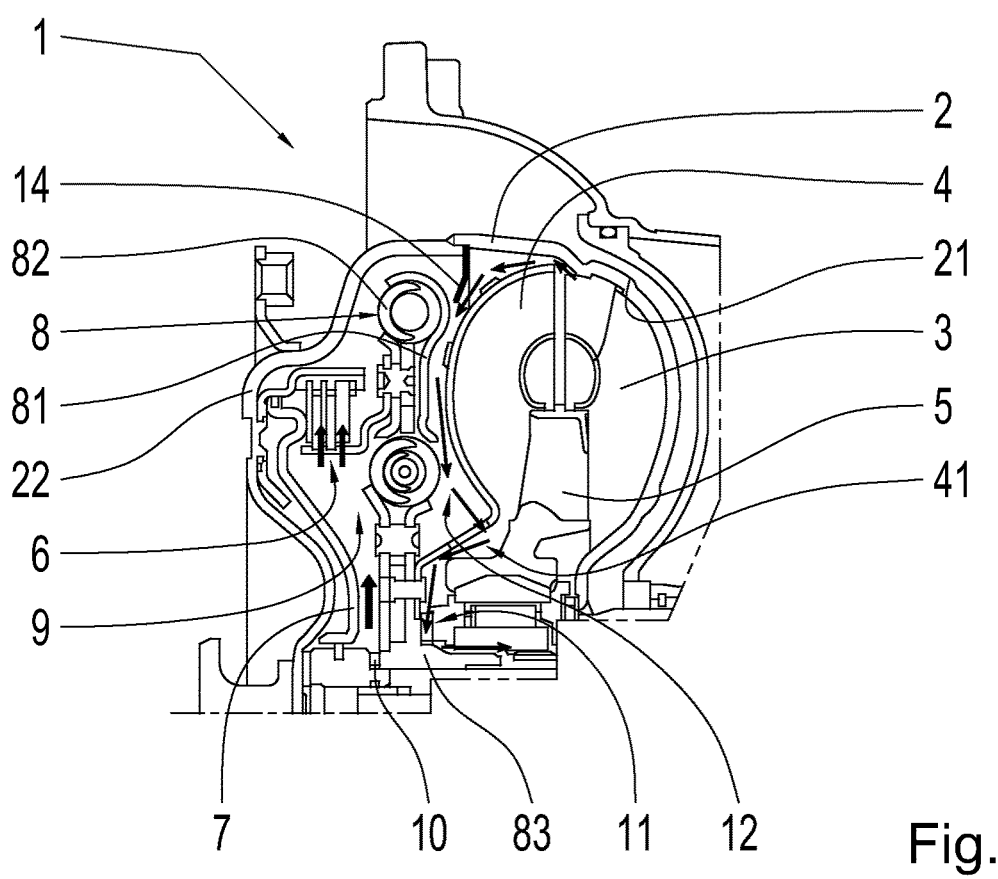
FIG. 2: A first embodiment of a hydrodynamic torque converter.
Figure 3:
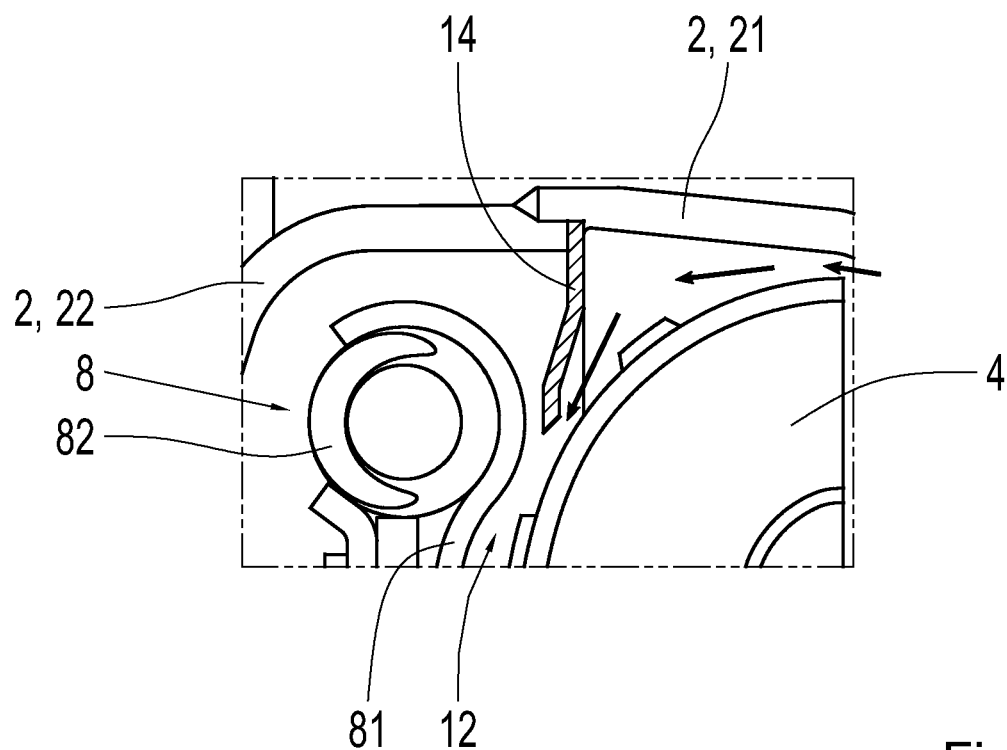
FIG. 3: A detailed view of the first embodiment shown in FIG. 2.
Figure 4:
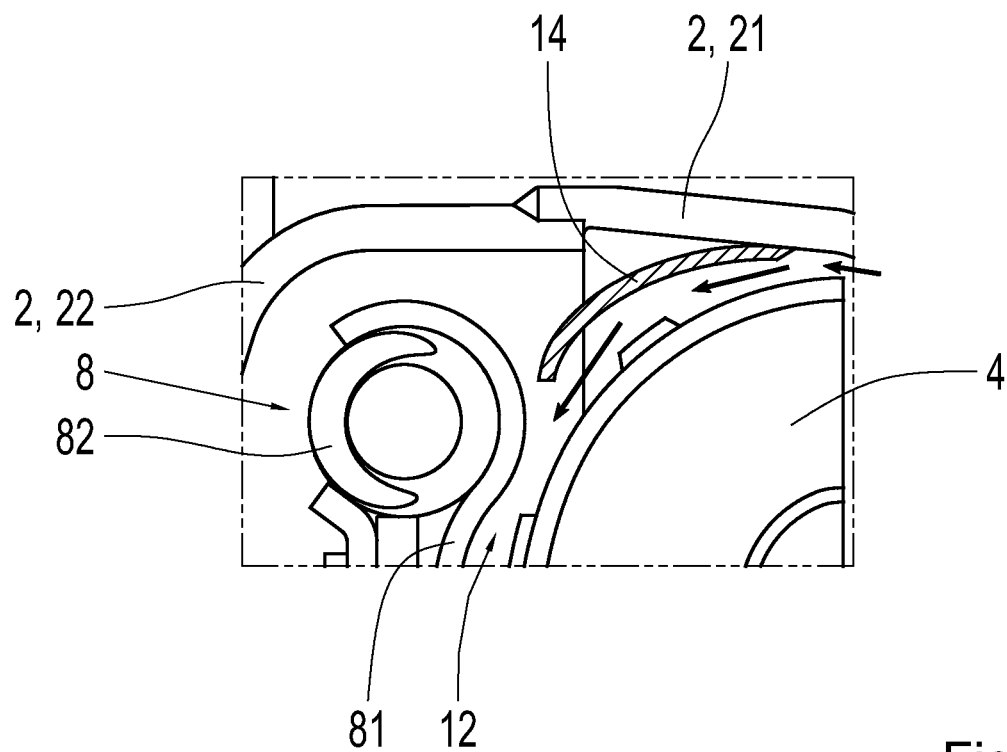
FIG. 4: A detailed view of a second embodiment of a hydrodynamic torque converter.

Preferred embodiments of such flow-guiding walls are shown in FIGS. 2 to 4. In each case the flow-guiding wall is indexed 14. In other respects the explanations relating to FIG. 1 also apply to FIGS. 2 to 4.

In FIG. 2 the effect of the flow-guiding wall 14 is indicated by arrows. As an example, the arrows represent on the one hand the relatively hot flow emerging from the torus and on the other hand the relatively cool flow emerging from the inlet opening 10. From this it can be seen that the wall 14 deflects the fluid flow radially inward in a targeted manner to the intermediate space 12. From that space the hydraulic fluid then leaves the converter 1 by way of the outlet opening 11. The fresh hydraulic fluid coming in through the inlet opening 10 reliably makes its way to the clutch 6.

FIG. 3 shows an enlarged view of the converter 1 in FIG. 2 in the area of the wall 14. From this it can be seen that in its radially outer area the wall 14 is suspended on the housing 2. In this case for example the wall is clamped between the two housing components 21 and 22. Alternatively or in addition the wall 14 can be attached elsewhere on the housing component 21 and/or on the housing component 22. For this, a welded joint is particularly well suited.

The wall 14 according to FIGS. 2 and 3 is annular and has a central opening located in the intermediate space 12. Thus, a gap is formed between the wall 14 and the damper 8, through which on the one hand relative movements between those structural elements 8 and 14 are possible, while on the other hand hydraulic fluid from the clutch 6 can flow past the damper 8 and into the intermediate space 12.

Preferably, the damper 8 has a torsion damper wall 81 which guides the hydraulic fluid radially inward into the intermediate space 12. The wall 81 screens the clutch 6 at least in a radially outer area of the damper 8 from the flow of relatively hot hydraulic fluid coming from the torus. In this radially outer area of the damper 8 curved springs 82 of the damper 8 can also be arranged on a common circumference or circumferential area. Here, the torsion damper wall 81 is positioned on the side of the damper 8 adjacent to the intermediate space 12, so that the curved springs 82 as well are screened from the relatively hot flow from the torus.

FIG. 4 shows an embodiment of the wall 14 alternative to that of FIGS. 2 and 3. The wall 14 in FIG. 4 has the same function as the wall in FIGS. 2 and 3. Thus, apart from the differences explained below, the explanations regarding the converter 1 of FIGS. 2 and 3 also apply to the converter 1 in FIG. 4.

Otherwise than in FIG. 3, in FIG. 4 the wall 14 is fixed at its radially outer area directly to the housing component 21. Here too, this is best done by welding. The wall 14 is bowl-shaped and has a central opening located in the intermediate space 12. Thus, in its radially outer area the wall 14 approaches the wall of the housing 2 approximately tangentially. That makes for a smooth deflection of the flow of hydraulic fluid from the torus into the intermediate space 12. This results in lower flow losses in the converter 1.

The walls 14 in FIGS. 2 to 4 are in each case made as separate structural elements of the converter 1. Here the wall 14 has the primary function of deflecting the hydraulic fluid coming from the torus radially inward to the intermediate space 12. A secondary effect of the wall 14 can be to make the housing 2 more rigid. However, no essential further function (secondary function) is envisaged for those walls 14.

In some embodiments the wall 14 can instead be made integrally with one of the housing components 21 or 22. The wall is then an integral part of the housing component 21 or 22 concerned. In such a case the wall 14 is made together with the housing component 21 or 22 concerned and does not have to be suspended on it separately.

INDEXES

1 Torque converter
2 Housing
21, 22 Housing component
3 Pump wheel
4 Turbine wheel
41 Opening
5 Guide wheel
6 Bridging clutch
7 Piston
8 Torsion damper
81 Torsion damper wall
82 Curved spring
83 Torsion damper hub
9 Intermediate space
10 Inlet opening
11 Outlet opening
12 Intermediate space

The invention claimed is:

1. A hydrodynamic torque converter comprising:
a pump wheel;
a turbine wheel;
a torsion damper;
an intermediate space being located between the turbine wheel and the torsion damper;
a torus being formed by the pump wheel and the turbine wheel for hydraulic fluid;
a flow-guiding wall for deflecting a radially outward flow of the hydraulic fluid emerging from the torus radially inward into the intermediate space located between the turbine wheel and the torsion damper;
a radially outlet opening, for removing hydraulic fluid from the hydrodynamic torque converter, being located between the torsion damper and the pump wheel; and
the turbine wheel having at least one opening formed therein through which the hydraulic fluid can flow from the intermediate space to the outlet opening.

2. The hydrodynamic torque converter according to claim 1, wherein the flow-guiding wall is annular or bowl-shaped, and
the flow-guiding wall has a central opening located in the intermediate space.

3. The hydrodynamic torque converter according to claim 1, wherein the flow-guiding wall is a separate structural element of the hydrodynamic torque converter.

4. The hydrodynamic torque converter according to claim 3, wherein the flow-guiding wall is disposed on a housing of the hydrodynamic torque converter that accommodates the pump wheel and the turbine wheel.

5. The hydrodynamic torque converter according to claim 4, wherein the pump wheel has blades which are attached to a housing component of the housing that forms the pump wheel, and
the flow-guiding wall is disposed on a pump component.

6. The hydrodynamic torque converter according to claim 4, wherein the housing comprises a housing component which accommodates at least one of the torsion damper and a bridging clutch, and
the flow-guiding wall is disposed on the housing component.

7. The hydrodynamic torque converter according to claim 1, further comprising a bridging clutch,
the bridging clutch is located on one side of the torsion damper between a housing and the torsion damper,
the intermediate space is located on an other side of the torsion damper between the turbine wheel and the torsion damper, and
the torsion damper has a torsion damper wall which guides the hydraulic fluid radially inward into the intermediate space.

8. The hydrodynamic torque converter according to claim 7, wherein the torsion damper wall screens the torsion damper, in a radially outer area, from the flow of the hydraulic fluid emerging from the torus.

9. The hydrodynamic torque converter according to claim 8, wherein curved springs of the torsion damper are arranged, in the radially outer area, on a common circumference or circumferential area.

10. A hydrodynamic torque converter comprising:
a pump wheel and a turbine wheel being arranged within a converter housing, and the pump wheel and the turbine wheel forming a torus for hydraulic fluid;
a torsion damper being arranged within the converter housing on an axial side of the turbine wheel opposite the pump wheel, and the torsion damper being axially spaced from the turbine wheel by an intermediate space located between the turbine wheel and the torsion damper; and
a flow-guiding wall being connected to the converter housing and extending from the converter housing such that a radially outward flow of the hydraulic fluid, emerging from the torus, being radially inward directed by the flow-guiding wall into the intermediate space located between the turbine wheel and the torsion damper;
wherein a radially outlet opening, for removing hydraulic fluid from the hydrodynamic torque converter, is located between the torsion damper and the pump wheel; and
the turbine wheel has at least one opening formed therein through which the hydraulic fluid can flow from the intermediate space to the outlet opening for removal from the hydrodynamic torque converter.

11. A hydrodynamic torque converter comprising:
a pump wheel;
a turbine wheel;
a torsion damper;
a bridging clutch being located on a side of the torsion damper opposite from the pump wheel and the turbine wheel;
an intermediate space being located between the turbine wheel and the torsion damper;
a torus being formed by the pump wheel and the turbine wheel for hydraulic fluid;
a flow-guiding wall for deflecting a radially outward flow of the hydraulic fluid, emerging from the torus, radially inward into the intermediate space located between the turbine wheel and the torsion damper;

a radially outlet opening, for removing hydraulic fluid from the hydrodynamic torque converter, being located between the torsion damper and the pump wheel;

the turbine wheel having at least one opening formed therein through which the hydraulic fluid can flow from the intermediate space to the outlet opening; and the hydrodynamic torque converter having a hydraulic fluid inlet opening, which communicates with the clutch, for supplying hydraulic fluid for cooling the clutch during operation.

\* \* \* \* \*